Figure 1:
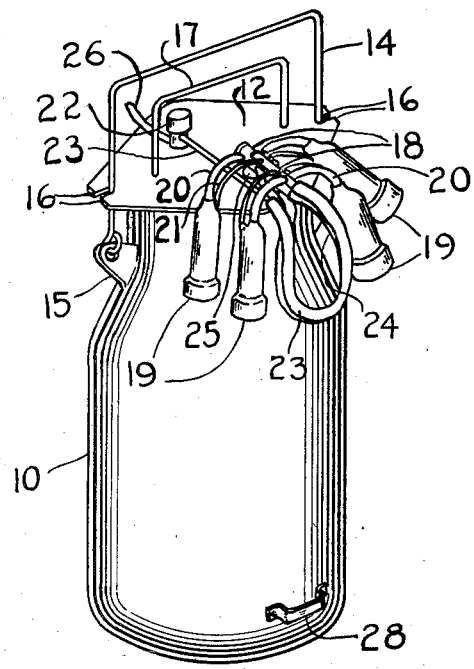

July 16, 1946.  R. L. HINMAN  2,404,068
MILKING MACHINE
Filed July 26, 1944

*INVENTOR.*
Ralph L. Hinman
BY
Theodore E. Simonton

Patented July 16, 1946

2,404,068

UNITED STATES PATENT OFFICE 2,404,068

MILKING MACHINE

Ralph L. Hinman, Oneida, N. Y.; Oneida Valley National Bank, executor of said Ralph L. Hinman, deceased, assignor to Hinman Milking Machine Co., Inc., Oneida, N. Y., a corporation of New York Application July 26, 1944, Serial No. 546,588

5 Claims. (Cl. 31—58)

The invention relates to improvements in milking machines, and more particularly to milking machines of the kind connective with an air suction line and a cow to milk the cow, the general purpose of the invention being to provide a milking machine of this type so constructed that the time, per cow, required in handling the machine to milk a cow and dump the milk is reduced to a minimum, that the liability of contamination of the milk in handling the machine to milk a cow and dump the milk is also reduced to a minimum, and that the machine may be readily cleaned and sterilized.

A further purpose of the invention is to provide a readily portable suction or vacuum milker or milking machine of the covered pail type having milking means connective with a main vacuum or suction line and a cow to milk the cow, wherein the pail, the cover and the attached milking means are so arranged and connected that the machine may be transported, used and dumped with maximum speed and ease without disconnecting the cover and milking means from the machine and with a minimum of danger of contaminating the milk, while at the same time permitting instant and easy detachment of the cover and its attached milking means from the pail without the use of tools when it is desired to clean the machine.

A further purpose of the invention is to provide an improved portable suction or vacuum milking machine of the covered pail type having milking means connected with the pail cover, wherein the pail and cover are so constructed and connected that milk may quickly be dumped through the mouth of the pail without detaching the cover and milking means from the pail; wherein the pail cover may be opened and the pail dumped with a maximum of ease and speed without exposing the milk to contamination by falling foreign matter; wherein the pail cover serves as a support for the milking means during handling and carriage of the machine and during dumping of milk from the pail to keep the milking means out of contact with the floor or ground while the milking means is disconnected from the main suction line and a cow; wherein the cover is maintained substantially normal to the bail and parallel to the ground or floor during milk dumping and during carriage of the machine to prevent accidental falling of the milking means into contact with the ground or floor; wherein the cover will overhang and protect a stream of milk being dumped from the pail; and wherein the pail cover and connected milking means may be instantly disconnected at will from the pail when desired.

Figure 2:
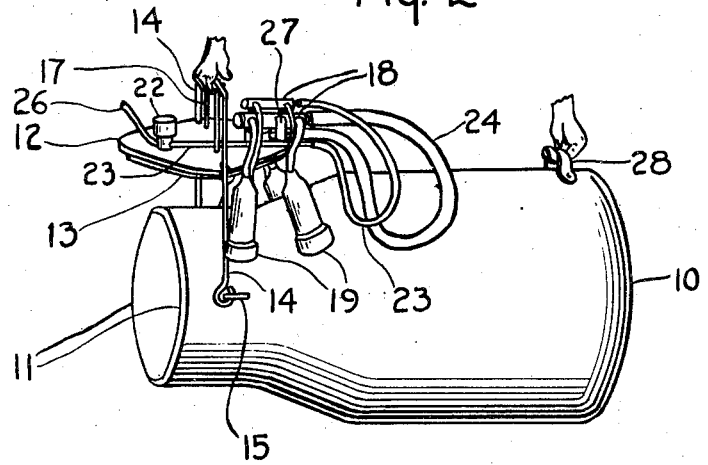

Other purposes and advantages of the invention will appear from the following detailed description of the preferred embodiment of the invention shown in the accompanying drawing in which Figure 1 is a perspective view of a milking machine embodying the invention with the parts conditioned for manual carriage, and Figure 2 is a perspective view showing the machine as it appears during dumping of milk therefrom.

The pail or milk receptacle 10 of the machine has an open mouth 11 at its upper end adapted to be closed and opened by movement of the pail cover. The cover preferably comprises a flat plate the perimeter of which overhangs the mouth of the pail, said plate carrying at its under face the usual circular sealing plug means 13 for fitting in the circular mouth of the pail when the cover is in pail-closing position. The cover is shown as being substantially diamond-shaped, but may be of any suitable contour.

A pail lifting and carrying bail 14 is hinged or pivotally connected to the pail closely adjacent the mouth 11 of the pail for relative swinging of the pail and bail about an axis passing diametrically through the pail at a distance from the mouth of the pail substantially less than the radial dimension of the pail mouth. By this choice of dimensions, the cover will overhang the pail and protect the issuing stream of milk when dumping as hereinafter described. The bail 14 has its side arms pivoted to a pair of diametrically opposed ears 15 fixed on the pail, the side arms of the bail being straight and parallel with each other and normal to the bail axis, and the cross-bar of the bail preferably being straight and parallel to the bail axis.

The pail cover 12 has two diametrically opposed narrow slots 16 extending inward toward each other from the perimetrical edge of the cover, each of said slots having its parallel longitudinal side edge walls closely and slidably embracing a different one of the bail side arms to prevent substantial rocking of the cover on said bail arms about an axis connecting the slots or any axis parallel to the bail axis, while permitting sliding of the cover up and down between the cross-bar of the bail 14 and the mouth 11 of the pail for opening and closing the pail. The inner end edges or walls of the slots 16 substantially abut the bail side arms to prevent accidental disconnection of the cover by lateral movement of the cover in the direction of length of the slots and the bail cross-bar.

The cover 12 has a rigid and upstanding lifting handle 17 of inverted U-shape located at the top face thereof and rigidly fixed thereto with the handle located within the confines of the bail 14. The legs of the handle 17 are located between the slots 16, and the cross-bar of the handle is located under the cross-bar of bail 14.

The spacing of the handle relatively to the bail is such that the handle and bail cross-bars may be enclosed or grasped by one hand when the cover is closed and the hand then contracted to draw the cover upward to open position. By then lifting the contracted hand, the entire machine may be lifted with the cover open. The spacing of the said cross-bar of bail 14 and handle 17 is also such that the cross-bar of the bail may be grasped without grasping the handle when it is desired to lift and carry the machine with the cover closed.

When it is desired to detach from the pail the cover 12 and the hereinafter described milking means which is connected with said cover, as when it is desired to clean the machine, it is simply necessary to cock or tilt the cover in the direction of the length of the cross-bars of the bail 14 and handle 17, or into a plane intersecting the bail axis, to free the bail side arms from slots 16 in the cover, whereupon the bail will swing about its axis under the influence of gravity and clear the cover and the said attached milking means for removal thereof from the pail. The spacing between said bail 14 and handle 17 when the cover is closed is sufficient to permit such cocking and removal of the cover and attached milking means while the cover is held in one hand by handle 17.

The machine is provided with the usual milking means connective as usual with a cow and with a main power means or suction or air line for milking a cow into the pail while the pail is closed by the cover. This known milking means is connected as is common in the art with the cover of the machine, it being understood that a number of machines are usually connected with the main air line or source of power. This milking means includes the known claw means 18 to which the usual teat cups 19 are connected by the usual milk and air lines 20 and 21, respectively, the usual pulsation creating means 22 connected by the usual air line 23 with the claw means, the usual milk line 24 leading from the claw means to the usual milk intake means 25 attached to the cover and opening into the pail, and the usual relatively short suction or air line 26 (only part of which is shown) adapted as usual for connection with the main suction or air line and connected as usual with the usual pulsation creating means 22. A suitable bracket or cradle 27 is held to the top of the cover as usual to assist in supporting the claw means and the teat cups 19 and the lines 20, 21, 23 and 24 from the cover out of contact with the floor or ground while the machine is disconnected or not in use. When the machine is disconnected, the line 26 attached to the cover may be looped or coiled about the legs of the handle 17 and/or the pulsation creating means 22 to keep said line out of contact with the floor or ground.

The pail has a dumping handle 28 fixed thereto at the exterior thereof adjacent the bottom of the pail at a point at an angle of about 90 degrees to the bail axis, as shown, so that when the bail 14 and handle 17 are conjointly clasped with one hand to open the pail and the pail is then lifted by said hand, the dumping handle 28 may thereupon be grasped by the other hand to tilt the pail relatively to the bail and cover as shown in Figure 2 to dump the pail without danger of contamination of the teat cups by said other hand in grasping dumping handle 28, or in grasping the bottom of the pail if the handle 28 be omitted from the machine. Provision of the dumping handle 28 avoids the necessity of contacting the ground engaging bottom of the pail with the hand used to tilt the pail.

Due to the construction of the machine, it will be observed that the cover remains substantially parallel to the ground during transportation and dumping of the pail so that danger of accidental falling of the claw, teat cups, and the milk and air lines to the ground is reduced to a minimum, and it will also be observed that in raising and lowering the cover and in dumping the pail, the cover extends over the mouth of the pail to prevent accidental droppage or falling of foreign matter into the pail. In dumping the pail, the cover will overhang the stream of milk being poured from the pail, thus protecting said stream of milk from falling foreign matter.

It will be obvious that the side arms of bail 14 need be parallel only within the zone of sliding movement of the cover between the pail mouth and the cross-bar of the bail and that other changes within the scope of the invention as defined in the appended claims may be made in the preferred construction shown in the drawing.

I claim:

1. A milking machine of the class set forth comprising, in combination, a milk receiving pail, a bail having a cross-bar and straight and parallel side portions located in a common plane and pivoted to the pail to swing about an axis extending across the pail close to the top of the pail, a combined milking means support and pail cover having a pair of opposed slots extending inward from its perimeter with the side walls of each slot closely embracing a different one of the side portions of the bail, milking means connected with said combined support and cover, and a lifting handle rigidly held to said combined support and cover within the confines of said bail for grasping of said handle and the bail cross-bar by a human hand to first lift the combined support and cover and to then lift both the pail and said combined support and cover conjointly, the spacing between the handle and the bail being such that the combined support and cover may be cocked relatively to the bail to disengage the bail side portions from said slots in the combined support and cover for removal of the latter from the machine.

2. A milking machine of the class set forth comprising, in combination, a milk receiving pail, a bail having straight and parallel side portions pivoted to the pail closely adjacent the upper end of the pail, a combined milking means support and pail cover having a pair of opposed slots extending inward from its perimeter with the side walls of each slot closely embracing a different one of the side portions of the bail, milking means connected to said combined support and cover, and a lifting handle rigidly held to said combined support and cover below the cross-bar of said bail and between the side portions of the bail and extending longitudinally of said bail cross-bar in position for grasping of said handle and the bail cross-bar by a human hand to first lift the combined support and pail cover and to then lift the pail and the combined support and cover conjointly, the spacing between the handle and the bail being such that the combined support and cover may be cocked relatively to the bail to disengage the bail side portions from said slots in the combined support and cover for removal of the latter from the machine, and a dumping handle carried by the pail for tilting the pail about the bail pivots to dump the pail while the pail cover is held open and the pail is held supported by a hand grasping the bail and the lifting handle, said pail dumping handle and bail being arranged so that the combined support and cover overhangs the open end of the pail during dumping of the pail so as to protect the stream of milk being dumped and to support the milking means from contact with the floor or ground.

3. In a power actuated milking machine of the kind having a pail, milking means detachably connective with a cow and a source of power, and a pail cover having means connecting the milking means and cover for withdrawal of milk from a cow into the pail through the cover while the cover is closed and means by which the milking means may be supported out of contact with the floor or ground when the machine is disconnected and is seated on the floor or ground with the cover closed, the combination with the pail and pail cover of the machine of a pail lifting and carrying bail having parallel side portions and pivoted to the pail for tilting of the pail relatively to the bail about an axis extending across the pail to dump the milk from the pail, means connecting the cover with said side portions of the bail for sliding movement of the cover relatively to the bail and pail in a plane substantially normal to the bail to open and close the pail, and a cover handle rigidly held to the cover and located substantially in the plane of the bail and within the confines of the bail for conjoint grasping of said handle and bail by a single hand of an operative to lift the pail and open said cover, the connecting means between the pail cover and said side portions of the bail being so constructed and arranged as to permit detachment of the cover from the bail by tilting the cover in the direction of the length of said axis and withdrawing the tilted cover from between said side portions of the bail.

4. A power actuated milking machine as claimed in claim 3, wherein the distance between the pivoted axis of the bail and the top of the pail is substantially less than one-half of the distance across the mouth of the pail, whereby the cover overhangs the mouth of the pail during dumping of milk from the pail.

5. In a milking machine having a milk receiving pail and milking means detachably connective with a source of power and a cow to milk a cow into said pail, the combination with said pail and milking means of a bail having substantially straight and parallel side portions located in a common plane and pivotally held to the pail for relative swinging movement between the pail and bail about an axis extending across and through the pail close to the upper end of the pail, a combined pail cover and milking means support to which the milking means is connected to milk a cow into the pail when the cover is closed and by which said milking means is adapted to be supported when disconnected from the source of power and the cow, said pail cover having a pair of opposed slots extending inward toward each other from the perimeter of the cover with each bail side portion closely embraced by the longitudinal side walls of a different one of said slots, a cover handle located exteriorly of the cover within the confines of said bail and fixed to the cover for grasping of said handle and the crossbar of the bail in one hand of an operative to first slide the cover upward along the bail side portions and to then lift the machine, and a pail dumping handle carried by the pail for grasping by the other hand of the operative to tilt the pail about said bail axis with the cover located above the tilted pail, the distance from the top of the pail to said bail axis being substantially less than the distance across the top of the pail so that the pail can be dumped with the opened cover overhanging the stream of milk during dumping, and the cover being tiltable at will longitudinally of the axis of the bail to disconnect the cover and the connected milking means from the bail.

RALPH L. HINMAN.